(12) United States Patent
Hrle et al.

(10) Patent No.: US 7,107,292 B1
(45) Date of Patent: Sep. 12, 2006

(54) FAST SYSTEM LEVEL RECOVERY

(75) Inventors: Namik Hrle, Boeblingen (DE); James Z. Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1188 days.

(21) Appl. No.: 09/687,450

(22) Filed: Oct. 13, 2000

(51) Int. Cl.
*G06F 17/30* (2006.01)

(52) U.S. Cl. .................................. 707/202; 707/104.1

(58) Field of Classification Search .............. 707/1, 707/2, 3, 4, 5, 6, 7, 8, 9, 10, 100, 101, 102, 707/103, 104, 200, 201, 202; 714/16, 19
See application file for complete search history.

(56) References Cited

U.S. PATENT DOCUMENTS

| | | | |
|---|---|---|---|
| 4,945,474 A | 7/1990 | Elliott et al. ................. 714/16 |
| 5,381,545 A | 1/1995 | Baker et al. ................. 714/19 |
| 5,561,798 A * | 10/1996 | Haderle et al. ............. 707/202 |
| 5,581,750 A * | 12/1996 | Haderle et al. ............. 707/202 |
| 5,642,505 A | 6/1997 | Fushimi ....................... 707/204 |
| 5,832,508 A * | 11/1998 | Sherman et al. ............ 707/200 |
| 5,933,838 A | 8/1999 | Lomet .......................... 707/202 |
| 5,946,698 A | 8/1999 | Lomet .......................... 707/202 |
| 6,651,073 B1 * | 11/2003 | Lyle et al. ................... 707/202 |

* cited by examiner

*Primary Examiner*—Jeffrey Gaffin
*Assistant Examiner*—Yicun Wu
(74) *Attorney, Agent, or Firm*—Sughrue Mion, PLLC (57) ABSTRACT

When recovering data in a database, initially, a database log, which records activities related to a database, is scanned. One or more individual objects that are to be recovered to a target time with reference to a backup time are identified.

93 Claims, 6 Drawing Sheets

FIG. 1

FIG. 2 bUR (400) = Beginning of Unit of Recovery eUR (410) = End of Unit of Recovery tCHPT (420) = Checkpoint Time tT (440) = Target Time tC (460) = Current Time

FAST SYSTEM LEVEL RECOVERY

BACKGROUND OF THE INVENTION

1. Field of the Invention

This invention relates in general to computer-implemented database management systems, and, in particular, to a more efficient database recovery system.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data. The definitions for SQL provide that a RDBMS should respond to a particular query with a particular set of data given a specified database content, but the technique that the RDBMS uses to actually find the required information in the tables on the disk drives is left up to the RDBMS. Typically, there will be more than one technique that can be used by the RDBMS to access the required data. The RDBMS will optimize the technique used to find the data requested in a query in order to minimize the computer time used and, therefore, the cost of performing the query.

Applications (i.e., application programs) communicate with relational databases using the Structured Query Language (SQL). SQL statements are issued to the RDBMS, which executes the SQL statements to access a relational database. The SQL statements received from an application are executed within a "unit of work", which is a collection of related SQL statements. Once the SQL statements are executed, they are either "committed" (i.e., the changes made by the executed SQL statements is made permanent in the relational database) or they are "rolled back" (i.e., the changes made by the executed SQL statements are removed, returning the relational database to the state it was in prior to execution of these statements).

One important aspect of managing a RDBMS is creating backups of the objects to insure data integrity in the event of crashes or other computer misfortunes. Conventional systems often generate backups in a nondisruptive manner by allowing full read/write access to the data being concurrently copied. By making nondisruptive backups of all of the objects conventional systems necessarily create "fuzzy backups" (i.e., backups containing uncommitted data) since one or more objects may be altered while being processed by an application during the backup operation. In other words, the backup does not contain all of the current object information.

In attempting to resolve this fuzzy backup problem, conventional systems perform a recovery procedure that retrieves objects or object data that was not initially recorded in the backup copy. Conventional systems, however, are not capable of selecting or determining which objects have been altered since the last backup operation. Therefore, in order to recover the most current objects, conventional systems resort to taking the system back to a point in time and recover all of the objects rather than only the objects that were actually altered.

The conventional systems described above utilizes what is generically referred to as a two-phase commit system. This system is based on points of consistency. A point of consistency is a point in time at which the data in the database is consistent. The two-phase commit system ensures that either all or none of the databases are updated, and, thus, ensures that the databases remain synchronized. More specifically, a first point of consistency exists when a COMMIT statement is invoked. A new point of consistency is established when the unit of work completes and the COMMIT statement has fully executed. The work completed or change implemented during this COMMIT interval is referred to as a unit of recovery (UR). Each UR represents, for example, an altered set of data or an altered object. The COMMIT statement ends a UR and commits the relational database changes that were made in that UR. While changes remain uncommitted, i.e., while an object or data is in the process of being altered, other application processes are unable to perceive these objects or data. Once committed, these database changes are accessible by other application processes.

Since conventional systems perform the backup and recovery tasks by simply copying all of the objects as they existed at a certain time, some of the object or data changes copied to the backup are uncommitted, resulting in fuzzy backups. Subsequent recoveries cannot be in general accomplished by only restoring the backup copies. Thus, in order to ensure that an object contains current data, conventional systems copy all of the objects from the backup copy and scan and apply the database log, which records all of the activities relating to a database, to identify what changes were made to that object. Reviewing the database log for each object and applying the appropriate changes to a backup copy can be very time consuming and expensive resulting in inefficient database recovery procedures.

In addition to copying all of the objects and applying the database log to these objects, an additional shortcoming of conventional systems is that they must backup objects at a "quiesce" point in time, i.e. the time when there are no uncommitted URs in the system. Establishing quiesce points is normally very disruptive for everyday operations. In order to create a quiesce point, the system suspends the creation of any new URs until all URs already started are committed. In the environments with long running URs, the attempts to create a quiesce point can bring the system to a standstill.

These shortcomings are further amplified when systems utilize multiple objects or large objects. For example, in environments with complex and practically unknown semantical integrity rules such as SAP® R/3®, Peoplesoft®, Baan®, etc., the only safe way to recover data or objects from a prior point in time is to bring the entire system, i.e. all the associated data and metadata back to that point in time. These systems consist of a large number of objects (tens of thousands) and often a large amount of data (hundreds or thousands of GB). System recoveries based on the 'fuzzy' backups of these systems are even more expensive and time consuming. Consequently, users may experience longer system down time and data recovery, system disruption, and increased costs of performing database backups and recoveries.

Accordingly, there is a need in the art for a framework for managing backup and recovery procedures in a database that identifies individual objects that have been altered, brings back the system to a particular time to recover those identified objects, and does so irrespective of the presence of uncommitted URs and quiesce points. That is, there is a need in the art for a more efficient object recovery system that can recover objects such that recovery times, database log analysis, system down time, and object recovery costs are minimized.

SUMMARY OF THE INVENTION

To overcome the limitations in the prior art described above, and to overcome other limitations that will become apparent upon reading and understanding the present specification, the present invention discloses a method, apparatus, and article of manufacture for an object-oriented framework for recovering data in a database.

In accordance with the present invention, a database log which records database activities is scanned. One or more individual objects that are to be recovered to a target time with reference to a backup time are identified.

BRIEF DESCRIPTION OF THE DRAWINGS

Referring now to the drawings in which like reference numbers represent corresponding parts throughout.

DETAILED DESCRIPTION

In the following description of embodiments of the invention, reference is made to the accompanying drawings which form a part hereof, and which is shown by way of illustration specific embodiments in which the invention may be practiced. It is to be understood that other embodiments may be utilized as structural changes may be made without departing from the scope of the present invention.

Hardware Architecture

Figure 1:
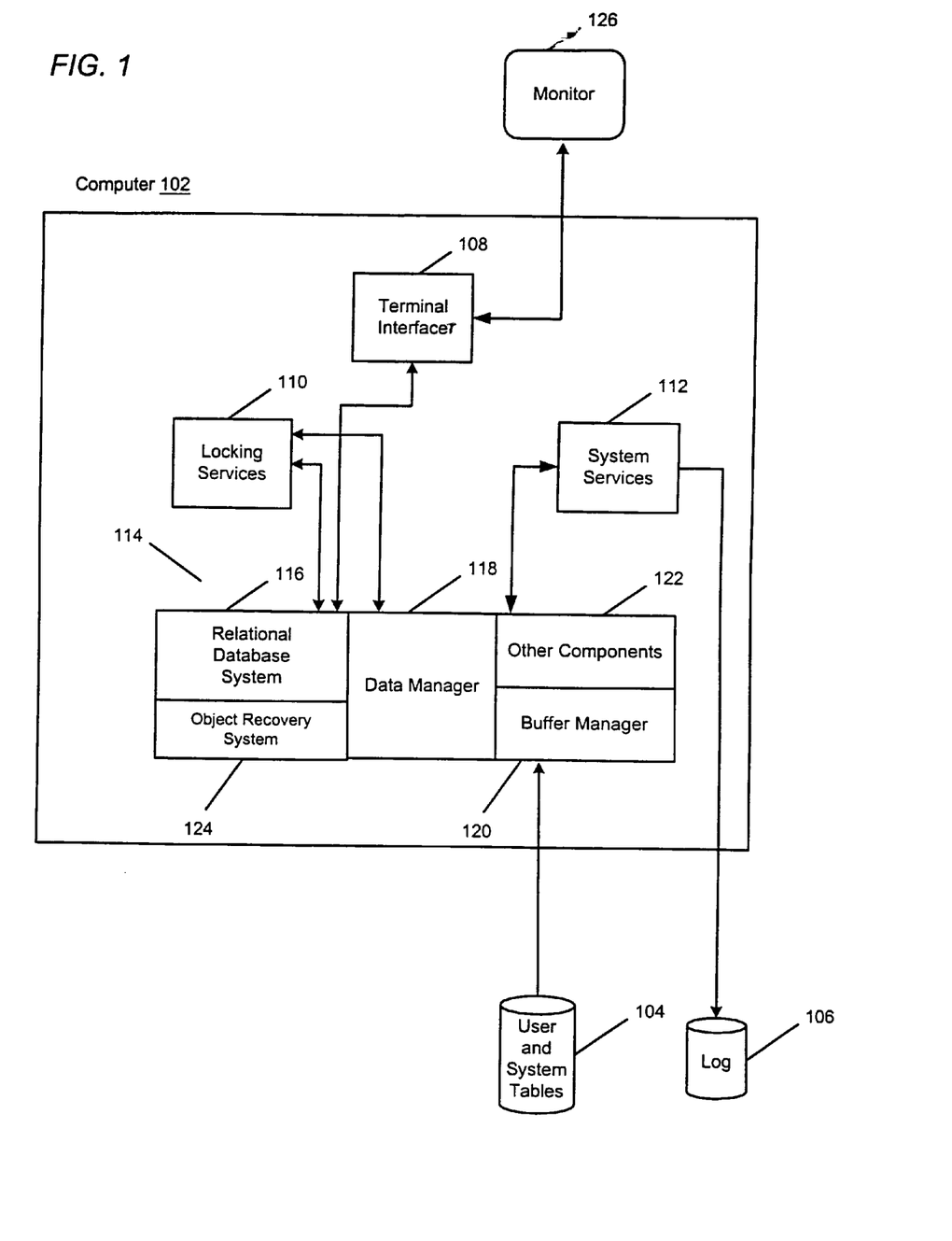
FIG. 1 is a schematic illustrating a hardware environment in one embodiment of the present invention, and more particularly, illustrates a typical database system.

FIG. 1 is a diagram illustrating a computer hardware environment that could be used in accordance with the present invention. In the environment, a computer system 102 is comprised of one or more processors connected to one or more data stores 104 and 106 that store one or more relational databases in tablespaces. The data stores 104 and 106 may comprise a fixed or hard disk drive, a floppy disk drive, a CDROM drive, a tape drive, or other device.

Operators of the computer system 102 use a standard operator interface 108, such as IMS/DB/DC®, CICS®, TSO®, OS/390®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In an embodiment of the present invention, the RDBMS software comprises the DB2® product offered by IBM® for the OS/390® operating systems. Those skilled in the art will recognize, however, that the present invention has application to any RDBMS software, whether or not the RDBMS software uses SQL.

As illustrated in FIG. 1, the DB2® system for the OS/390® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® system execution environment, including managing database log 106 data sets, gathering statistics, handling startup and shutdown, and providing management support.

At the center of the DB2® system is the Database Services module 114. The Database Services module 114 contains several submodules, including the Relational DataBase Management System (RDBMS) or "database system" 116, the Data Manager 118, the Buffer Manager 120, and other components 122 such as an SQL compiler/interpreter. Additionally, an Object Recovery System 124 works in conjunction with the other modules. These submodules support the functions of the SQL language, i.e. definition, access control, interpretation, compilation, database retrieval, and update of user and system data.

The present invention is generally implemented using SQL statements executed under the control of the Database Services module 114. The Database Services module 114 retrieves or receives the SQL statements, wherein the SQL statements are generally stored in a text file on the data stores 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the database software, the SQL statements, and the instructions derived therefrom, are all tangibly embodied in a computer-readable medium, e.g. one or more of the data stores 104 and 106. Moreover, the database software, the SQL statements, and the instructions derived therefrom, are all comprised of instructions which, when read and executed by the computer system 102, causes the computer system 102 to perform, implement and/or use the present invention. Under control of an operating system, the database software, the SQL statements, and the instructions derived therefrom, may be loaded from the data stores 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the environment illustrated in FIG. 1 is not intended to limit the present invention. Indeed, those skilled in the art will recognize that other alternative hardware environments may be used without departing from the scope of the present invention.

Fast System Level Recovery

A. Overview

One embodiment of the present invention provides an object recovery system 124 that executes in conjunction with a database system 116, for example, a RDBMS. The object recovery system 124 determines an optimal combination of data restorations and applications of the database log 106 to the contents of an object to recover a system to a target time.

Figure 2:
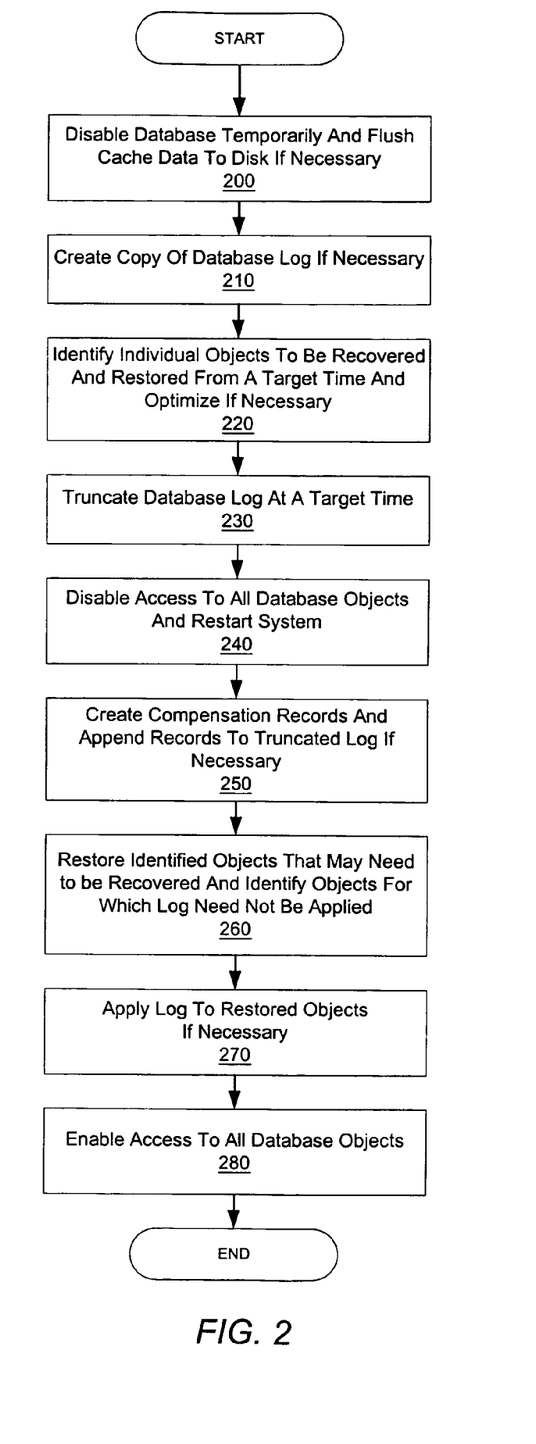
FIG. 2 is a flow diagram illustrating processing performed by an object recovery system in one embodiment.

FIG. 2 is a flow diagram illustrating processing performed by the object recovery system 124 in one embodiment. In particular, the object recovery system 124 identifies individual objects that must be recovered after a backup of a database.

In block 200, at a current time, the object recovery system 124 may temporarily render the database inactive and flush any necessary data in cache memory to disk.

In block 210, the object recovery system 124 creates a copy of the database log 106. A database log 106 is a record of the database activity which may be used for statistical, backup and/or recovery purposes. For example, a database log 106 may record the details of a transaction (i.e., a unit of work) or modifications to the database as a result of, for example, an INSERT or DELETE statement.

In an alternative embodiment, the object recovery system 124 may proceed to block 220 without making a copy of the database log 106. A copy of the database log 106 is created as a precautionary measure since some of the original database log 106 entries may eventually be permanently deleted. For example, if the database log 106 is truncated at an incorrect time, any database log 106 entries that were deleted may not be recoverable. Thus, making a copy of the database log 106 may ensure that the original database log may be retrieved if the selection of the truncation point is not made with desired confidence or accuracy.

In block 220, the object recovery system 124 identifies one or more individual objects that are to be recovered and restored to a target time (i.e., a time before the current time to which the database is brought back), and optimizes the processing if desired.

In block 230, the database log 106 is truncated at the target time ($t_T$) 340. A user or a system may decide where to truncate the database log 106. As a result, only part of the database log 106 exists, i.e., the truncated database log 106 includes data up to the selected target time ($t_T$) 340. In one embodiment, the object recovery system 124 may then begin a new database log record beginning from the target time ($t_T$) 340 for future database activities.

In block 240, in order to prevent the database from accessing inconsistent objects, the object recovery system 124 disables access to all of the database objects, including any metadata objects. The object recovery system 124 then restarts the database resulting in a "conditional" database. This type of restart will detect URs that were uncommitted at the time the database log 106 was truncated, i.e., at the target time ($t_T$) 340.

In block 250, the object recovery system 124 creates compensation log records, if necessary, and appends (i.e., writes) these compensation log records to the truncated database log 106 to enable uncommitted changes that were made to the object data to be backed out.

In block 260, the object recovery system 124 restores the identified objects that may need to be recovered (i.e., restores objects with uncommitted URs) and identifies objects that may be restored without applying the database log 106 to those objects. Then in block 270, the database log 106 is applied to restored objects, if necessary. In block 280, the object recovery system 124 releases the previous hold on the objects and enables the database to access all of the objects.

B. Quiesce at Current Time

In this section, the object recover system 124 will quiesce at current time (i.e., the memory is flushed and there are no uncommitted URs in the system).

With respect to the identification of objects to be recovered, the object recovery system 124 scans the database log 106 from a checkpoint time (before the target time) to the current time and detects when URs have been completed. In other words, the object recovery system 124 detects all of the URs that were existing in the system from the beginning of the last checkpoint time (before the target time) until the current time.

Figure 3:
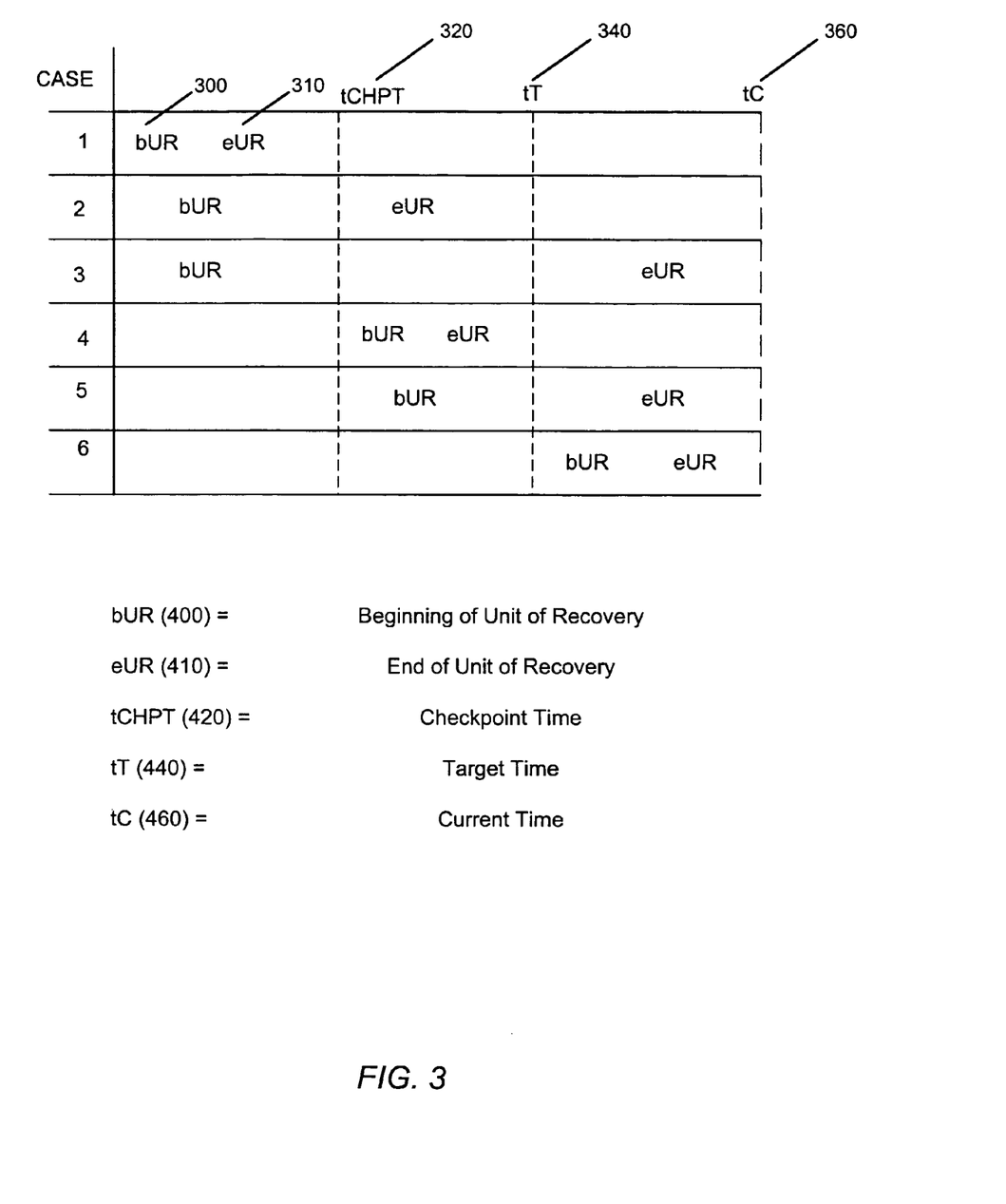
FIG. 3 is a time chart illustrating in further detail a technique of identifying individual objects that are to be recovered by the object recovery system at a target time.

FIG. 3 is a time chart illustrating example scenarios in which a unit of recovery (UR) begins and ends at different times relative to a checkpoint, a target time, and a current time. In particular, individual objects are identified based on different time variables, and, for each unit of recovery, the object recovery system 124 detects the beginning of a UR ($b_{UR}$) 300 and the end of a UR ($e_{UR}$) 310. Each UR represents a unit of work consisting of a recoverable sequence of operations executed by a database system for an application process. In other words, each UR may represent an altered set of data or an altered object. In other words, a UR is defined by points such that either all or none of the objects of the database are updated. The COMMIT statement ends a UR and commits the database changes that were made in that UR. While changes remain uncommitted, other application processes are unable to perceive them. Once committed, these database changes are accessible by other application processes.

The time at which a UR begins and ends determines whether the object associated with a UR has to be recovered, whether the recovery process can be optimized, and whether the database log 106 must be applied to those objects.

The time at which a UR completes is analyzed within a time line based on a checkpoint time ($t_{CHPT}$) 320, a target time ($t_T$) 340, and a current time ($t_C$) 360. The checkpoint time ($t_{CHPT}$) 320 and target time ($t_T$) 340 occur before the current time ($t_C$) 360.

A checkpoint time ($t_{CHPT}$) 320 serves as an initial reference point. The object recovery system 124 begins to scan the database log 106 from checkpoint time ($t_{CHPT}$) 320 (before the target time ($t_T$) 340) to the current time.

FIG. 3 only illustrates the beginning of a checkpoint as indicated by checkpoint time ($t_{CHPT}$) 320. However, there may also be an end of the checkpoint, and at this time, another database log record may be generated. Further, there may be multiple checkpoints, and thus, multiple checkpoint times, and these scenarios will be discussed further below. One embodiment of the present invention, as illustrated in FIG. 3, identifies the beginning of a checkpoint as indicated by checkpoint time ($t_{CHPT}$) 320 which occurs before a target time ($t_T$) 340.

Target time ($t_T$) 340 is the time to which the object recovery system 124 brings back the database. The target time ($t_T$) 340 represents the time at which the database log 106 will eventually be truncated such that the truncated database log 106 can be utilized to determine which objects contain altered data. For example, assume a user was working with a database and saved a file on a Monday at 5:00 p.m. Further assume that on the following Tuesday morning, the user continued to use the file, and then the user wants to restore the database to represent data existing as of Monday at 5:00 pm, then the target time ($t_T$) 340 would be Monday, 5:00 pm. The target time ($t_T$) 340 may be selected or defined by a user, a database administrator, or other individual. In an alternative embodiment, the target time is system-defined; that is, a system (e.g., a system program) may be configured to select the target time ($t_T$) 340.

Following is a detailed description of how objects to be recovered are identified based on scanning and analyzing the database log 106. The database log 106 is scanned from a checkpoint time ($t_{CHPT}$) 320 (before the target time ($t_T$) 340) through the current time ($t_C$) 360. Within this time frame, the object recovery system 124 analyzes the database log 106 to detect when one or more URs began and ended. Based on these times, it may or may not be necessary to recover the object.

An object may not need to be recovered if an object was committed before the target time ($t_T$) 340. Further, since cached data is flushed at current time ($t_C$) 360, in these scenarios, both the target time ($t_T$) 340 and the current time ($t_C$) 360 occur after any and all object changes have been written to disk since the UR has completed and been committed. Referring to FIG. 3, Cases 1, 2 and 4 represent scenarios in which it is not necessary to recover an object.

More specifically, the database log 106 does not need to be applied to objects with URs corresponding to Cases 1, 2, and 4 since these objects are not even recovered. The objects that may have to proceed with the subsequent log apply phase include those objects with URs corresponding to Cases 3, 5, and 6. After the database log 106 has been applied to objects, then the object recovery system 124 proceeds to block 280.

CASE 1

In Case 1, the object recovery system 124 begins to scan the database log 106 from checkpoint time ($t_{CHPT}$) 320. In this case, $b_{UR}$ 300, the beginning of a UR, and $e_{UR}$ 310, the end of a UR, are both completed before the checkpoint time ($t_{CHPT}$) 320. Consequently, the object recovery system 124 does not detect an uncommitted UR since it detects neither $b_{UR}$ 300 nor $e_{UR}$ 310. In other words, any changes that were implemented were present at both the target time ($t_T$) 340 and the current time ($t_C$) 360. Thus, it is not necessary to recover objects associated with these URs since there is not a concern that an object or object data has changed.

CASE 2

It is not necessary for the object recovery system 124 to recover objects associated with URs illustrated in Case 2. In this case, the object recovery system 124 begins a scan of the database log 106 from the checkpoint time ($t_{CHPT}$) 320. In doing so, the object recovery system 124 does not detect $b_{UR}$ 300, but it does detect $e_{UR}$ 310 prior to the target time ($t_T$) 340. Detecting $e_{UR}$ 310 prior to the target time ($t_T$) 340 signifies that the UR was completed and committed before target time ($t_T$) 340. Consequently, any changes that were implemented existed at both the target time ($t_T$) 340 and the current time ($t_C$) 360. Therefore, the object recovery system 124 does not need to recover objects associated with these URs since the data is the same at target time ($t_T$) 340 as it is at current time ($t_C$) 360.

CASE 3

In Case 3, the object recovery system 124 begins the scan of the database log 106 at the checkpoint time ($t_{CHPT}$) 320. The object recovery system 124 does not detect $b_{UR}$ 300, however, the object recovery system 124 does detect $e_{UR}$ 310 after target time ($t_T$) 340. Thus, the UR was not completed and committed until after target time ($t_T$) 340. Consequently, taking the database back to target time ($t_T$) 340 would not reflect changes made to the object after target time ($t_T$) 340. Thus, the object recovery system 124 identifies objects associated with these URs as objects that are to be recovered and restored.

In particular, the object recovery system 124 detects $e_{UR}$ 310 after the target time ($t_T$) 340, i.e., after the database log 106 has been truncated. When $e_{UR}$ 310 is identified, the object recovery system 124 may generate a compensation record with the appropriate DELETE and INSERT statements and append the compensation record to the truncated database log 106. As a result, the application of the truncated database log 106 in conjunction with the added log section results in accurate and current object data.

CASE 4

Case 4 provides an additional example in which it is not necessary for the object recovery system 124 to recover an object. As the object recovery system 124 scans the database log 106 from checkpoint time ($t_{CHPT}$) 320, the object recovery system 124 detects both $b_{UR}$ 300 and $e_{UR}$ 310, both of which occur before target time ($t_T$) 340. The UR is completed and committed before the target time ($t_T$) 340, and as a result, there are no changes to the object or object data between the target time ($t_T$) 340 and the current time ($t_C$) 360. Consequently, the object recovery system 124 may or may not recover objects associated with these URs.

CASE 5

In Case 5, the object recovery system 124 identifies objects to be recovered. In this case, a scan of the database log 106 starting from checkpoint time ($t_{CHPT}$) 320 detects $b_{UR}$ 300, which occurs before target time ($t_T$) 340. Continuing the database log 106 scan, the object recovery system 124 also detects $e_{UR}$ 310 after target time ($t_T$) 340, which signifies that the UR was not committed before target time ($t_T$) 340. Thus, the object recovery system 124 identifies objects associated with these URs as objects to be recovered and restored.

CASE 6

In Case 6, the object recovery system 124 scans the database log 106 from checkpoint time ($t_{CHPT}$) 320 and detects bu 300 and e$_{UR}$ 310 after target time (t$_T$) 340. Thus, the UR was not committed until after the target time (t$_T$) 340, and the object recovery system 124 identifies objects with these URs to be recovered and restored.

C. Target Time After Backup Time

Figure 4A:
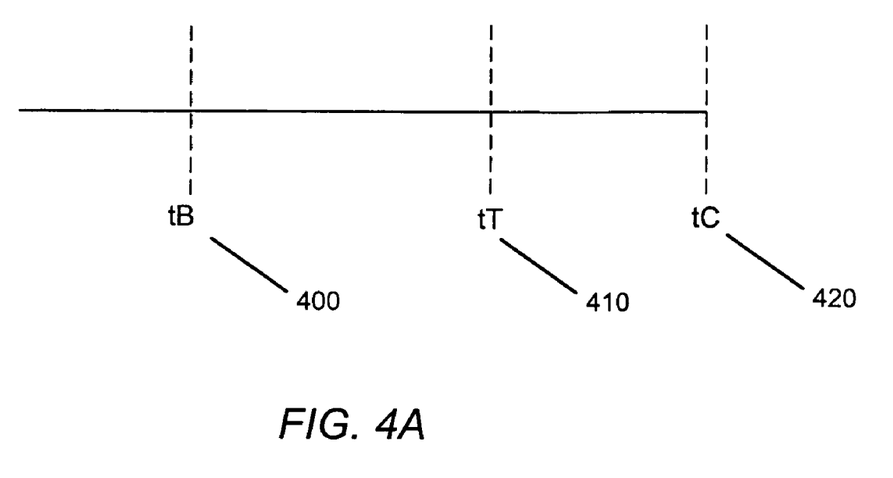
FIG. 4A is a time chart illustrating a target time ($t_T$) occurring after a backup time ($t_B$).

FIG. 4A is a time chart illustrating a target time (t$_T$) 410 occurring after a backup time (t$_B$) 400. Backup time (t$_B$) 400 represents the time at which a backup of the database was created. Target time (t$_T$) 410 represents the time to which the object recovery system 124 brings back the database. Current time (t$_C$) 420 may be a time at which the system is stopped or may be a point when the system crashed.

When creating backups of a database, the object recovery system 124 may utilize different backup procedures, including for example, volume based backups, object-based backups or logical backups. It may be desirable for the object recovery system 124 to utilize volume-based backup procedures if the backup is taken by 'snapping' the entire database. In other words, all of the data, metadata and system volumes (such as recovery logs, etc.) may be copied simultaneously. In volume-based backups, each object contains an indication of the most recent time when all the data (i.e., data blocks or pages) for that particular object resided in the underlying datasets on disks. In other words, there is an indication whether there is no data in the database cache that is more current than the data on disk. This indicator enables the object recovery system 124, to apply the database log 106, if necessary.

Logical objects backups are made by the database itself or a tool that has access to the database cache. As a result, data that is cached in the database at the time of taking such a backup can be copied as well. This places the starting point of the database log 116 scan at the time when the backup began.

The backup time (t$_B$) 400 represents a time at which a fuzzy backup of a recoverable database object, data set or volume was taken. Additionally, the backup time (t$_B$) 400 and the closest fuzzy backup times to the target time (t$_T$) 410. In other words, the backup at (t$_B$) 400 represents a backup that contains uncommitted URs because, for example, an application was manipulating an object when the backups were generated. In an alternative embodiment, it is possible that backup time (t$_B$) 400 does not exist for each object, and the object must be recreated entirely from the database log 106.

For the scenario in FIG. 4A, the object recovery system 124 restores data, without restoring the log. As stated above, the current time (t$_C$) 420 may be a time at which the system is stopped or may be a point when the system crashed.

When the system crashes, the object recovery system 124 may proceed to block 210 without rendering the database temporarily inactive and/or without flushing cache data to disk. For example, the current time (t$_C$) 420 may represent the time when a user is working with a database and the database crashes. In this instance, the current time (t$_C$) 420 represents a time when a user experiences a data integrity problem and needs to recover the database contents to a target time (t$_T$) 410.

In this case, a database Restart operation can not be used to recover the data to the recovery point because the data and log are not consistent. Therefore, the object recovery system 124 uses a Conditional Restart with DEFER ALL. This brings all DB2® members down; deletes certain structures, including LOCK structures; restores DB2® data from the backup taken at the backup time (t$_B$) 400; creates a restart record; starts DB2® with the DEFER ALL option, which writes logs to backout uncommitted changes; and, resolves in-doubt URs. The object recovery system 124 uses LOGONLY or Image Copy Recovery for all tablespaces, by recovering directory/catalog objects first and following the same order as for disaster recovery. The object recovery system 124 also rebuilds all indexes using, for example, LOGONLY Recovery or Image Copy Recovery for indexes.

Figure 4B:
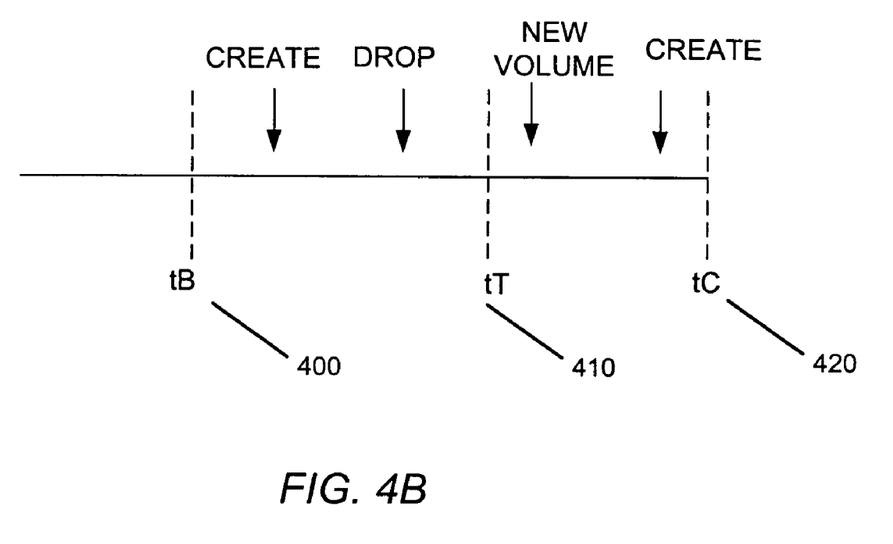
FIG. 4B is a time chart illustrating several scenarios involving CREATE, DROP, and NEW VOLUME operations.

FIG. 4B is a time chart illustrating several scenarios involving CREATE, DROP, and NEW VOLUME operations. That is, there may be objects created between the backup time (t$_B$) 400 and target time (t$_T$) 410 or between the target time (t$_T$) 410 and current time (t$_C$) 420. To handle objects that were created between the backup time (t$_B$) 400 and target time (t$_T$) 410, the object recovery system 124 uses an Image Copy Recovery or Rebuild Index. To handle objects that were dropped between the backup time (t$_B$) 400 and target time (t$_T$) 410, the object recovery system 124 deletes the orphan datasets. Additionally, the object recovery system 124 reformats volumes added after the target time (t$_T$) 410. A trace is used to monitor some operations, such as CREATE, DROP, or EXTEND.

Figure 4C:
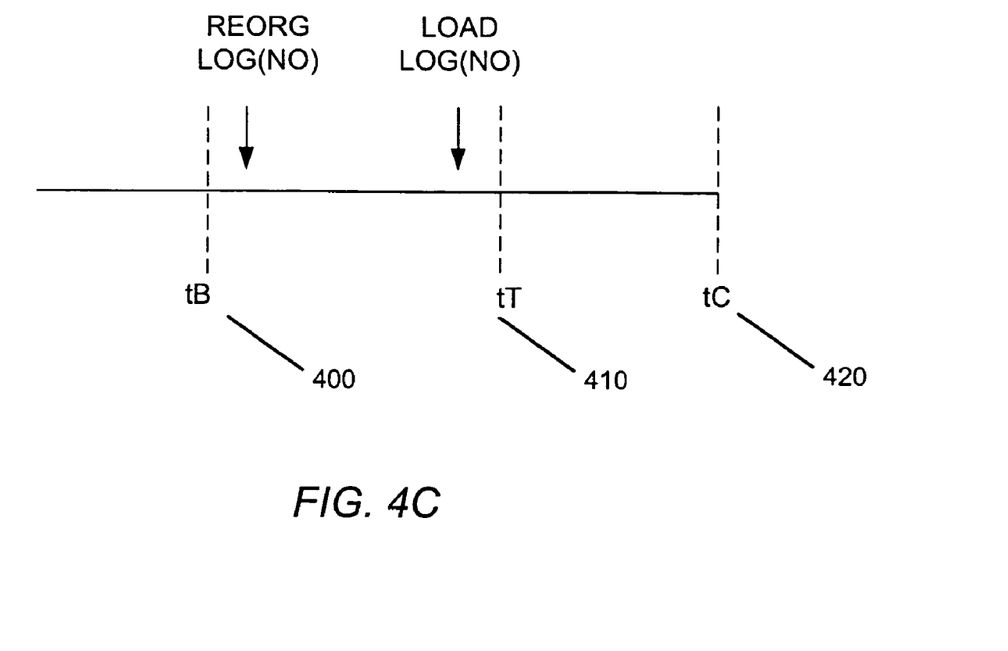
FIG. 4C is a time chart illustrating scenarios with REORG LOG(NO) and LOAD LOG(NO) operations.

FIG. 4C is a time chart illustrating scenarios with REORG LOG(NO) and LOAD LOG(NO) operations. For objects accessed by REORG LOG(NO) and LOAD LOG(NO), the object recovery system 124 uses an Image Copy Recovery. Also, the object recovery system 124 will determine LOG (NO) events prior to restoring the database catalog and directory. Note that LOG(NO) objects are objects whose associated transactions were not logged.

Figure 4D:
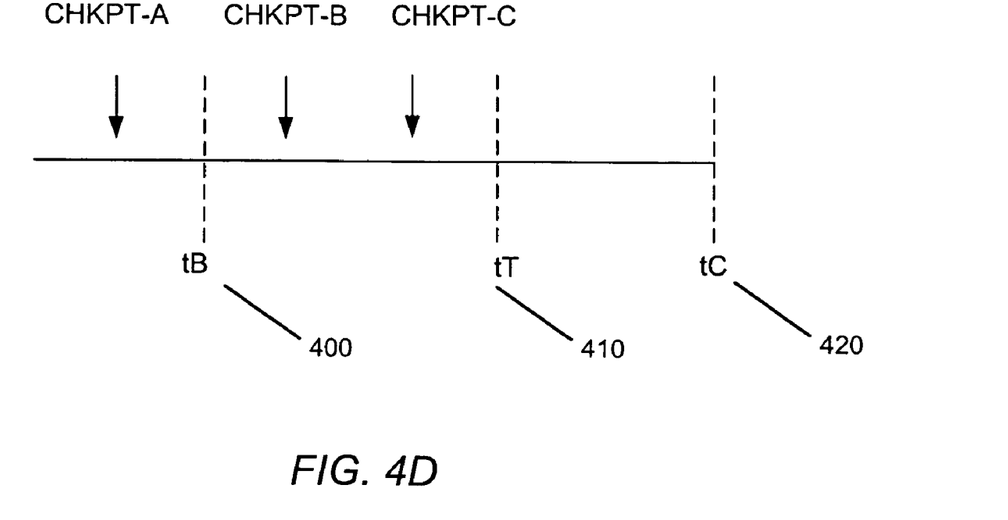
FIG. 4D is a time chart illustrating scenarios with checkpoints CHKPT-A, CHKPT-B, and CHKPT-C.

FIG. 4D is a time chart illustrating scenarios with checkpoints CHKPT-A, CHKPT-B, and CHKPT-C. The object recovery system 124 identifies objects that need to be recovered by scanning database recovery logs to identify write pending objects between CHKPT-A and the backup time (t$_B$) 400. Then, the object recovery system 124 identifies all UR-modified objects between the backup time (t$_B$) 400 and target time (t$_T$) 410. Alternatively, the object recovery system 124 may look for entries in one or more DBMS catalog tables to identify object that are changed across or beyond the backup time (t$_B$) 400. Then, the object recovery system 124 recovers the DBMS catalog tables and directory objects.

D. Target Time Before Backup

Figure 5A:
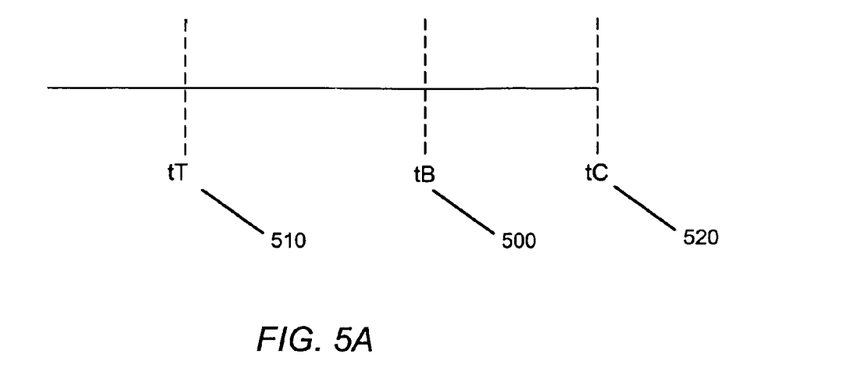
FIG. 5A is a time chart illustrating a target time ($t_T$) occurring before a backup time ($t_B$).

FIG. 5A is a time chart illustrating a target time (t$_T$) 510 occurring before a backup time (t$_B$) 500. Backup time (t$_B$) 500 represents the time at which a backup of the database was created. Target time (t$_T$) 510 represents the time to which the object recovery system 124 brings back the database. Current time (t$_C$) 520 may be a time at which the system is stopped and is quiesced or may be a point when the system crashed.

For the scenario in FIG. 5A, the object recovery system 124 restores data, and, optionally, restores the log. In this case, the object recovery system 124 uses a Conditional Restart with DEFER ALL. DEFER ALL indicates that when a system is restarted, access to the database is not available. Conditional Restart with DEFER ALL brings all DB2® members down; deletes certain structures, including LOCK structures; restores DB2® data and log from the backup taken at the backup time (t$_B$) 500; creates a restart record; starts DB2® with the DEFER ALL option, which writes logs to backout uncommitted changes; and, resolves in-doubt URs. The object recovery system 124 uses Image Copy Recovery for all tablespaces, by recovering directory/catalog objects first. The object recovery system also rebuilds all indexes using, for example, Image Copy Recovery for indexes.

Figure 5B:
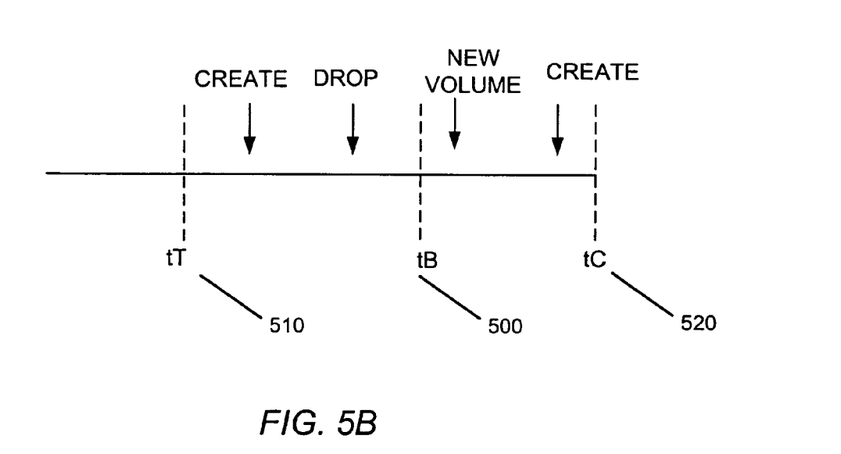
FIG. 5B is a time chart illustrating several scenarios involving CREATE, DROP, and NEW VOLUME operations.

FIG. 5B time chart illustrating several scenarios involving CREATE, DROP, and NEW VOLUME operations. That is, there may be objects created between the target time ($t_T$) 510 and the backup time ($t_B$) 500 or between the backup time ($t_B$) 500 and current time ($t_C$) 520. For objects that were created between the target time ($t_T$) 510 and the backup time ($t_B$) 500, note that the objects will not exist after the DBMS catalog tables are recovered, and the object recovery system 124 deletes orphan datasets. To handle objects that were dropped after target time ($t_T$) 510, the objects will reappear after the catalog is recovered. Additionally, the object recovery system 124 reformats volumes added after the backup time ($t_B$) 500. A trace is used to monitor some operations, such as CREATE, DROP, or EXTEND.

Figure 5C:
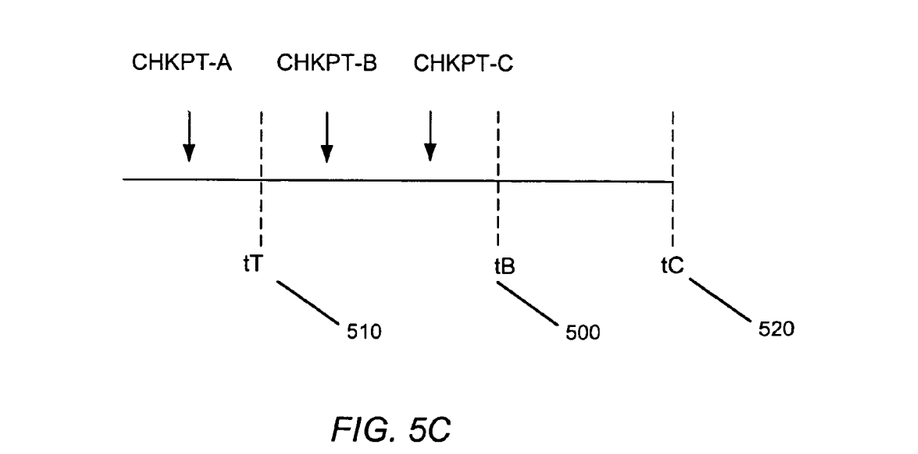
FIG. 5C is a time chart illustrating scenarios with checkpoints CHKPT-A, CHKPT-B, and CHKPT-C.

FIG. 5C time chart illustrating scenarios with checkpoints CHKPT-A, CHKPT-B, and CHKPT-C. The object recovery system 124 identifies objects that need to be recovered by scanning database recovery logs to identify write pending and UR-modified objects between CHKPT-A and the backup time ($t_B$) 500. Alternatively, the object recovery system 124 may look for entries in one or more DBMS catalog tables to identify object that are across or beyond the target time ($t_T$) 500 before restoring the system using the log suspend copy.

E. Further Optimizations

Objects may be optimized to provide more efficient processing (block 220). More specifically, objects may be grouped in a more efficient manner such that objects for which backups reside on the same volumes have the same optimization level. More specifically, the object recovery system 124 determines whether it is more efficient to restore and recover only identified individual objects or restore entire volumes and recover corresponding objects. In making this determination, the object recovery system 124 may consider several different factors. For example, the object recovery system 124 may consider whether most of the objects that need to be recovered reside on the same volume. Restoring the volume and applying the database logs 106 to the objects in this instance may be more efficient than restoring individual objects. However, the amount of log data that needs to be scanned is generally larger if a volume-based recovery is instituted initially.

Trademarks

IBM, DB2, CICS, OS/390, ODBC, and IMS/DB/DC are trademarks or registered trademarks of International Business Machines, Corporation in the United States and/or other countries.

SAP and R/3 are trademarks or registered trademarks of SAP Aktiengesellschaft in the United States and/or other countries.

Peoplesoft is a trademark or registered trademark of PeopleSoft, Inc. in the United States and/or other countries.

CONCLUSION

This concludes the description of some embodiments of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the embodiments of the invention have been presented for the purposes of illustration and description. They are not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of recovering data in a database of a database system stored in a datastore connected to a computer, the method comprising:
scanning a database log, wherein the database log records activities related to the database; and
identifying one or more individual objects to be recovered to a target time with reference to a backup time,
wherein an object is associated with different units of recovery, wherein one or more units of recovery require different levels of processing, and wherein the object is recovered utilizing the highest level of processing.

2. The method of claim 1, wherein the target time is user-defined.

3. The method of claim 1, wherein the backup time is user-defined.

4. The method of claim 1, further comprising analyzing the database log to detect when a unit of recovery begins and when the unit of recovery ends.

5. The method of claim 4, wherein an object is not recovered when the unit of recovery accessing that object ends before the target time and there are no pending writes for the object.

6. The method of claim 5, wherein the unit of recovery begins and ends before a checkpoint time, and wherein the checkpoint time occurs before the target time.

7. The method of claim 5, wherein the unit of recovery begins before a checkpoint time, and wherein the unit of recovery ends after the checkpoint time but before the target time.

8. The method of claim 5, wherein the unit of recovery begins after a checkpoint time, and wherein the unit of recovery ends before the target time.

9. The method of claim 4, wherein an object is recovered if the unit of recovery begins before the target time, and wherein the unit of recovery ends after the target time but before a current time, wherein the current time represents when object data is recorded to the database.

10. The method of claim 9, wherein the unit of recovery begins before a checkpoint time.

11. The method of claim 9, wherein the unit of recovery begins after a checkpoint time but before the target time.

12. The method of claim 4, wherein an object is recovered if the unit of recovery begins after the target time, and wherein the unit of recovery ends before a current time, wherein the current time represents when object data is recorded to the database.

13. The method of claim 1, wherein a backup is taken.

14. The method of claim 13, wherein the backup occurs prior to the target time and further comprising restoring data without restoring the database log.

15. The method of claim 13, wherein the backup occurs after the target time and further comprising restoring data and optionally restoring the database log.

16. The method of claim 13, further comprising restarting the database system with a conditional restart with defer all option.

17. The method of claim 1, further comprising flushing cache data to disk.

18. The method of claim 1, further comprising truncating the database log at the target time.

19. The method of claim 18, further comprising disabling access to the database and restarting the database system, wherein restarting detects uncommitted units of recovery.

20. The method of claim 19, further comprising creating a compensation log and appending the compensation log to the truncated database log beginning from the target time.

21. The method of claim 1, further comprising restoring the identified objects.

22. The method of claim 21, further comprising determining whether the database log should be applied to the restored objects to update the identified objects with current object data.

23. The method of claim 22, when the determination is made to apply the database log to the identified objects, further comprising optimizing the identified objects such that the identified objects may be restored without applying the database log to the identified objects.

24. The method of claim 23, if the objects can not be optimized, applying the database log to the restored objects.

25. The method of claim 21, after restoring the identified objects, further comprising providing access to the identified objects.

26. The method of claim 1, further comprising optimizing the identified objects by restoring a volume of the datastore and recovering corresponding objects.

27. The method of claim 1, further comprising optimizing the identified objects by grouping the identified objects, wherein the grouped objects have backups residing on the same volume of the datastore.

28. The method of claim 1, wherein the one or more individual objects to be recovered to a target time are recovered from a current time.

29. The method of claim 28, wherein the current time represents at time at which the database system crashed.

30. The method according to claim 1, wherein said target time represents a time to which the database is restored.

31. The method according to claim 1, wherein said backup time represents a time at which a backup of the database is created.

32. An apparatus for recovering data in a database of a database system, comprising:
 a computer having a data store connected thereto, wherein the data store stores data; and
 one or more computer programs, performed by the computer, for scanning a database log, wherein the database log records activities related to the database and for identifying one or more individual objects to be recovered to a target time with reference to a backup time;
 wherein an object is associated with different units of recovery wherein one or more units of recovery require different levels of processing and wherein the object is recovered utilizing the highest level of processing.

33. The apparatus of claim 32, wherein the target time is user-defined.

34. The apparatus of claim 32, wherein the backup time is user-defined.

35. The apparatus of claim 32, further comprising analyzing the database log to detect when a unit of recovery begins and when the unit of recovery ends.

36. The apparatus of claim 35, wherein an object is not recovered when the unit of recovery accessing that object ends before the target time and there are no pending writes for the object.

37. The apparatus of claim 36, wherein the unit of recovery begins and ends before a checkpoint time, and wherein the checkpoint time occurs before the target time.

38. The apparatus of claim 36, wherein the unit of recovery begins before a checkpoint time, and wherein the unit of recovery ends after the checkpoint time but before the target time.

39. The apparatus of claim 36, wherein the unit of recovery begins after a checkpoint time, and wherein the unit of recovery ends before the target time.

40. The apparatus of claim 35, wherein an object is recovered if the unit of recovery begins before the target time, and wherein the unit of recovery ends after the target time but before a current time, wherein the current time represents when object data is recorded to the database.

41. The apparatus of claim 40, wherein the unit of recovery begins before a checkpoint time.

42. The apparatus of claim 40, wherein the unit of recovery begins after a checkpoint time but before the target time.

43. The apparatus of claim 32, wherein an object is recovered if the unit of recovery begins after the target time, and wherein the unit of recovery ends before a current time, wherein the current time represents when object data is recorded to the database.

44. The apparatus of claim 32, wherein a backup is taken.

45. The apparatus of claim 44, wherein the backup occurs prior to the target time and further comprising restoring data without restoring the database log.

46. The apparatus of claim 44, wherein the backup occurs after the target time and further comprising restoring data and optionally restoring the database log.

47. The apparatus of claim 44, further comprising restarting the database system with a conditional restart with defer all option.

48. The apparatus of claim 32, further comprising flushing cache data to disk.

49. The apparatus of claim 32, further comprising truncating the database log at the target time.

50. The apparatus of claim 49, further comprising disabling access to the database and restarting the database system, wherein restarting detects uncommitted units of recovery.

51. The apparatus of claim 50, further comprising creating a compensation log and appending the compensation log to the truncated database log beginning from the target time.

52. The apparatus of claim 32, further comprising restoring the identified objects.

53. The apparatus of claim 52, further comprising determining whether the database log should be applied to the restored objects to update the identified objects with current object data.

54. The apparatus of claim 53, when the determination is made to apply the database log to the identified objects, further comprising optimizing the identified objects such that the identified objects may be restored without applying the database log to the identified objects.

55. The apparatus of claim 54, if the objects can not be optimized, applying the database log to the restored objects.

56. The apparatus of claim 52, after restoring the identified objects, further comprising providing access to the identified objects.

57. The apparatus of claim 32, further comprising optimizing the identified objects by restoring a volume of the datastore and recovering corresponding objects.

58. The apparatus of claim 32, further comprising optimizing the identified objects by grouping the identified objects, wherein the grouped objects have backups residing on the same volume of the datastore.

59. The apparatus of claim 32, wherein the one or more individual objects to be recovered to a target time are recovered from a current time.

60. The apparatus of claim 59, wherein the current time represents at time at which the database system crashed.

61. The apparatus according to claim 32, wherein said target time represents a time to which the database is restored.

62. The apparatus according to claim 32, wherein said backup time represents a time at which a backup of the database is created.

63. An article of manufacture comprising a computer program carrier readable by a computer and embodying one or more instructions executable by the computer for recovering data in a database of a database system, comprising:
   scanning a database log, wherein the database log records activities related to the database; and
   identifying one or more individual objects to be recovered to a target time with reference to a backup time,
   wherein an object is associated with different units of recovery, wherein one or more units of recovery require different levels of processing and wherein the object is recovered utilizing the highest level of processing.

64. The article of manufacture of claim 63, wherein the target time is user defined.

65. The article of manufacture of claim 63, wherein the backup time is user defined.

66. The article of manufacture of claim 63, further comprising analyzing the database log to detect when a unit of recovery begins and when the unit of recovery ends.

67. The article of manufacture of claim 66, wherein an object is not recovered when the unit of recovery accessing that object ends before the target time and there are no pending writes for the object.

68. The article of manufacture of claim 67, wherein the unit of recovery begins and ends before a checkpoint time, and wherein the checkpoint time occurs before the target time.

69. The article of manufacture of claim 67, wherein the unit of recovery begins before a checkpoint time, and wherein the unit of recovery ends after the checkpoint time but before the target time.

70. The article of manufacture of claim 67, wherein the unit of recovery begins after a checkpoint time, and wherein the unit of recovery ends before the target time.

71. The article of manufacture of claim 66, wherein an object is recovered if the unit of recovery begins before the target time, and wherein the unit of recovery ends after the target time but before a current time, wherein the current time represents when object data is recorded to the database.

72. The article of manufacture of claim 71, wherein the unit of recovery begins before a checkpoint time.

73. The article of manufacture of claim 71, wherein the unit of recovery begins after a checkpoint time but before the target time.

74. The article of manufacture of claim 66, wherein an object is recovered if the unit of recovery begins after the target time, and wherein the unit of recovery ends before a current time, wherein the current time represents when object data is recorded to the database.

75. The article of manufacture of claim 63, wherein a backup is taken.

76. The article of manufacture of claim 75, wherein the backup occurs prior to the target time and further comprising restoring data without restoring the database log.

77. The article of manufacture of claim 75, wherein the backup occurs after the target time and further comprising restoring data and optionally restoring the database log.

78. The article of manufacture of claim 75, further comprising restarting the database system with a conditional restart with defer all option.

79. The article of manufacture of claim 63, further comprising flushing cache data to disk.

80. The article of manufacture of claim 63, further comprising truncating the database log at the target time.

81. The article of manufacture of claim 80, further comprising disabling access to the database and restarting the database system, wherein restarting detects uncommitted units of recovery.

82. The article of manufacture of claim 81, further comprising creating a compensation log and appending the compensation log to the truncated database log beginning from the target time.

83. The article of manufacture of claim 81, wherein the current time represents at time at which the database system crashed.

84. The article of manufacture of claim 63, further comprising restoring the identified objects.

85. The article of manufacture of claim 84, further comprising determining whether the database log should be applied to the restored objects to update the identified objects with current object data.

86. The article of manufacture of claim 85, when the determination is made to apply the database log to the identified objects, further comprising optimizing the identified objects such that the identified objects may be restored without applying the database log to the identified objects.

87. The article of manufacture of claim 86, if the objects can not be optimized, applying the database log to the restored objects.

88. The article of manufacture of claim 84, after restoring the identified objects, further comprising providing access to the identified objects.

89. The article of manufacture of claim 63, further comprising optimizing the identified objects by restoring a volume of the datastore and recovering corresponding objects.

90. The article of manufacture of claim 63, further comprising optimizing the identified objects by grouping the identified objects, wherein the grouped objects have backups residing on the same volume of the datastore.

91. The article of manufacture of claim 63, wherein the one or more individual objects to be recovered to a target time are recovered from a current time.

92. The article of manufacture according to claim 63, wherein said target time represents a time to which the database is restored.

93. The article of manufacture according to claim 63, wherein said backup time represents a time at which a backup of the database is created.

* * * * *